US008827161B2

(12) United States Patent
Fukuba et al.

(10) Patent No.: US 8,827,161 B2
(45) Date of Patent: Sep. 9, 2014

(54) OPTIMIZED ILLUMINATION FOR AN OMNISCANNER

(75) Inventors: Ken Fukuba, Warabi (JP); Tohru Takahashi, Saitama (JP)

(73) Assignees: Opticon, Inc., Renton, WA (US); Optoelectronics Co., Ltd. (JP)

( * ) Notice: Subject to any disclaimer, the term of this patent is extended or adjusted under 35 U.S.C. 154(b) by 888 days.

(21) Appl. No.: 12/672,757

(22) PCT Filed: Aug. 14, 2007

(86) PCT No.: PCT/US2007/075851
§ 371 (c)(1),
(2), (4) Date: Jul. 8, 2011

(87) PCT Pub. No.: WO2009/023028
PCT Pub. Date: Feb. 19, 2009

(65) Prior Publication Data
US 2012/0002100 A1     Jan. 5, 2012

(51) Int. Cl.
G06K 7/10 (2006.01)
G06K 15/12 (2006.01)
H04N 5/222 (2006.01)
G03B 15/03 (2006.01)
G03B 15/06 (2006.01)

(52) U.S. Cl.
CPC .... G06K 7/10722 (2013.01); *G06K 2207/1013* (2013.01); G06K 7/10801 (2013.01); *G06K 7/10732* (2013.01)
USPC ...... 235/462.42; 348/370; 348/371; 396/155; 396/175; 235/462.41; 235/462.43

(58) Field of Classification Search
USPC ............... 348/370–371; 396/61–62, 155, 396/166–178
See application file for complete search history.

(56) References Cited

U.S. PATENT DOCUMENTS

| | | | |
|---|---|---|---|
| 4,711,567 A | 12/1987 | Tanimoto et al. | |
| 5,783,811 A | 7/1998 | Feng et al. | |
| 6,832,725 B2 | 12/2004 | Gardiner et al. | |
| 2003/0107668 A1* | 6/2003 | Yamamoto | 348/357 |
| 2003/0128284 A1* | 7/2003 | Yamamoto | 348/240.3 |
| 2004/0050935 A1 | 3/2004 | Swartz et al. | |
| 2004/0252253 A1* | 12/2004 | Miyashita et al. | 349/58 |
| 2005/0074233 A1* | 4/2005 | Seo | 396/200 |
| 2005/0087601 A1* | 4/2005 | Gerst et al. | 235/455 |
| 2005/0103858 A1* | 5/2005 | Zhu et al. | 235/462.22 |
| 2005/0174474 A1* | 8/2005 | Hasegawa | 348/370 |
| 2005/0174475 A1* | 8/2005 | Yoshida | 348/370 |
| 2005/0175257 A1* | 8/2005 | Kuroki | 382/278 |

(Continued)

OTHER PUBLICATIONS

International Preliminary Report on Patentability, dated Feb. 16, 2010 of International Application No. PCT/US07/75851, filed Aug. 14, 2007.

(Continued)

*Primary Examiner* — Michael Osinski
(74) *Attorney, Agent, or Firm* — Kaplan Breyer Schwarz & Ottesen, LLP

(57) ABSTRACT

An imaging device preferably for use in a 2-D CCD or CMOS sensor is disclosed. The illumination means uses a plurality of illumination sources, some of which are coupled to lenses in an offset manner to promote far field illumination, and some of which are not so coupled and are arranged to provide near field illumination.

10 Claims, 4 Drawing Sheets

(56) References Cited

U.S. PATENT DOCUMENTS

| | | |
|---|---|---|
| 2006/0113386 A1* | 6/2006 | Olmstead .................. 235/454 |
| 2006/0118627 A1* | 6/2006 | Joseph et al. ............. 235/454 |
| 2006/0152586 A1* | 7/2006 | Komiya et al. .......... 348/207.99 |
| 2006/0180670 A1* | 8/2006 | Acosta et al. ........... 235/462.31 |
| 2007/0030675 A1* | 2/2007 | Oon et al. .................. 362/237 |
| 2007/0216797 A1* | 9/2007 | Yoshida et al. ............. 348/370 |
| 2008/0149723 A1 | 6/2008 | Zhu et al. |
| 2008/0192235 A1* | 8/2008 | Komiya et al. ................ 356/72 |

OTHER PUBLICATIONS

International Search Report and Written Opinion, dated Mar. 6, 2008 of International Application No. PCT/US07/75851, filed Aug. 14, 2007.

Examiner: Gerhard Bohm-Wirt, "Related German Patent Application No. 11 2007 003 623.0 Office Action", Nov. 29, 2013, Publisher: DE PTO, Published in: DE.

* cited by examiner

OPTIMIZED ILLUMINATION FOR AN OMNISCANNER

TECHNICAL FIELD

This invention relates to imaging devices, and more specifically, to an optimized illumination system having particular application in 2-D imaging systems.

BACKGROUND OF THE INVENTION

2-D imaging systems typically involve an illumination means and an imaging array, such as Complimentary Metal on Silicon ("CMOS") or a Charge Coupled Device ("CCD"). Such systems use LEDs or other means to illuminate the object to be captured, and the light reflected from such object is then incident upon the imaging matrix. One problem associated with such devices is that the depth of field over which the illumination of the object can be kept constant is relatively narrow. For example, FIG. 1 shows how the intensity of illumination falls off drastically as a function of distance from the source.

In the prior art, solutions to this problem typically involve installing an additional one or more LEDs or other illumination means, which is directed to the area close to the device. One such arrangement is disclosed in U.S. Published Application No. 2006-0219792. In the '792 publication, two modes of operation are used, each of which has its own associated set of LEDs. Depending upon whether it is desired to capture images in the near field or far field, a different mode of operation is selected, which results in a different set of LEDs being illuminated. However, the position of the various LEDs, renders this arrangement somewhat less than optimal.

Another prior art arrangement with a separate set of LEDs to illuminate an area close to the imaging array is disclosed in U.S. Published Application No. 2006-0118627. As depicted in FIGS. 2A and 2B of the present application, which are taken from the referenced publication, showing a device having a housing 20, folding mirror 44, two illumination systems 42A and 42B, and imager 40. Illumination system 42A includes a plurality of LEDs exteriorly arranged on housing 20 around window 18. Each exterior LED projects light over a conical volume, shown as region 56A and 56B. The second illumination system 42B includes one or more LEDs disposed in housing 20 remote from window 18. The LEDs of system 42B project light over conical volume 58. In this fashion, system 42A illuminates a near range field-of-view and system 42B illuminates a far-range field-of-view, a separate set of LEDs is disposed vertically to the remaining circuit board in the device, and light is directed from these LEDs to illuminate the close in field of view.

These and other prior art arrangements are all suboptimal in that they require arrangements that are either too large in size, too expensive to manufacture, or which are cumbersome to use. Many involve positioning the source of secondary illumination in a manner that increases the manufacturing cost of the device.

Some such prior art arrangements are also less than optimal because the illumination means are positioned in a manner that may shine into a user's eyes. Thus, there exists a need in the art for an improved device that can provide for uniform illumination over a wide range of distances from the imaging array.

DETAILED DESCRIPTION OF THE PREFERRED EMBODIMENTS

The above and other problems with the prior art are overcome in accordance with the present invention which relates to the technique of providing both near field and far field illumination while at the same time avoiding many of the drawbacks of the prior art. Specifically, a plurality of illumination sources such as LEDs are utilized, where each is positioned behind a lens in an offset manner. Because the LED is offset with respect to the lens in front thereof, the illumination can be directed to the far or near fields of view.

Figure 1:
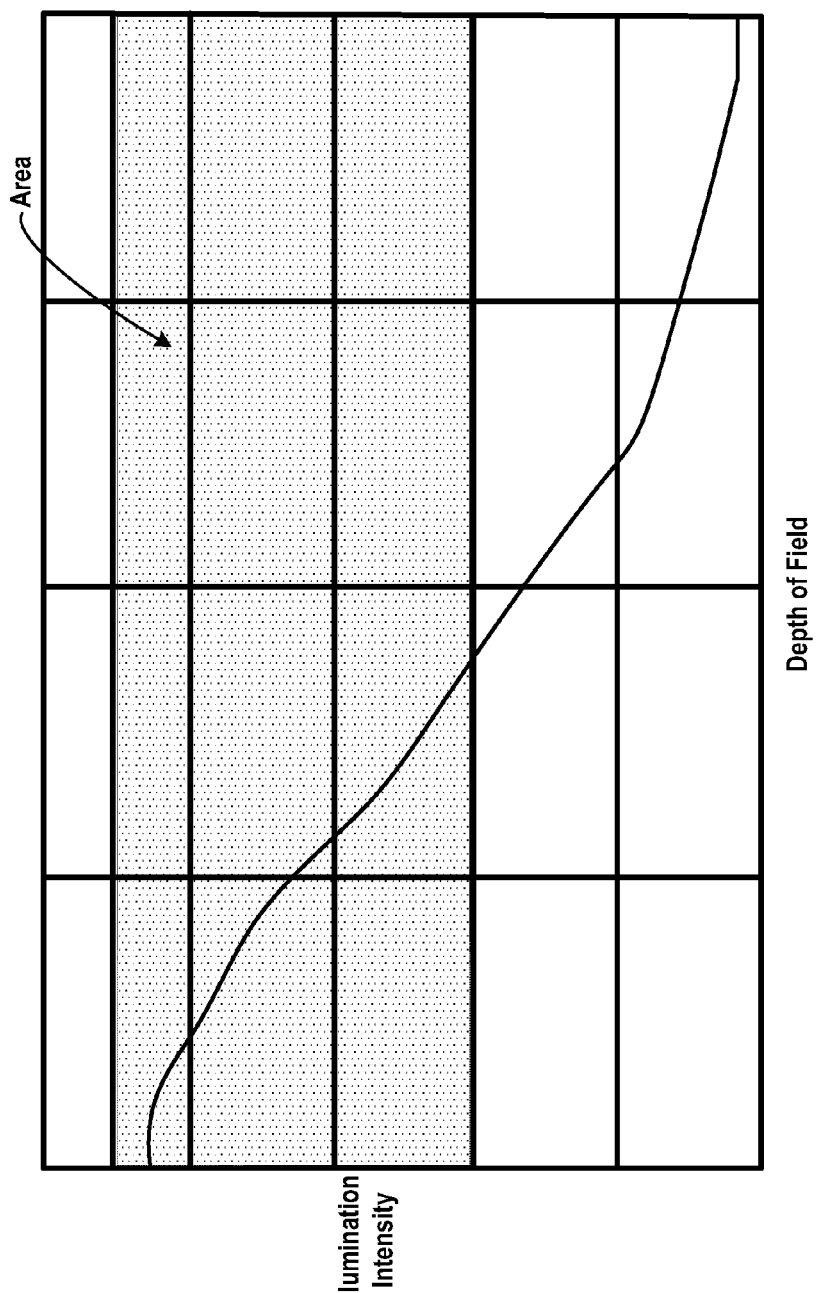
FIG. 1 shows the intensity of light over field of view as distance from the imaging array varies, using a prior art system.
Figures 2A, 2B:
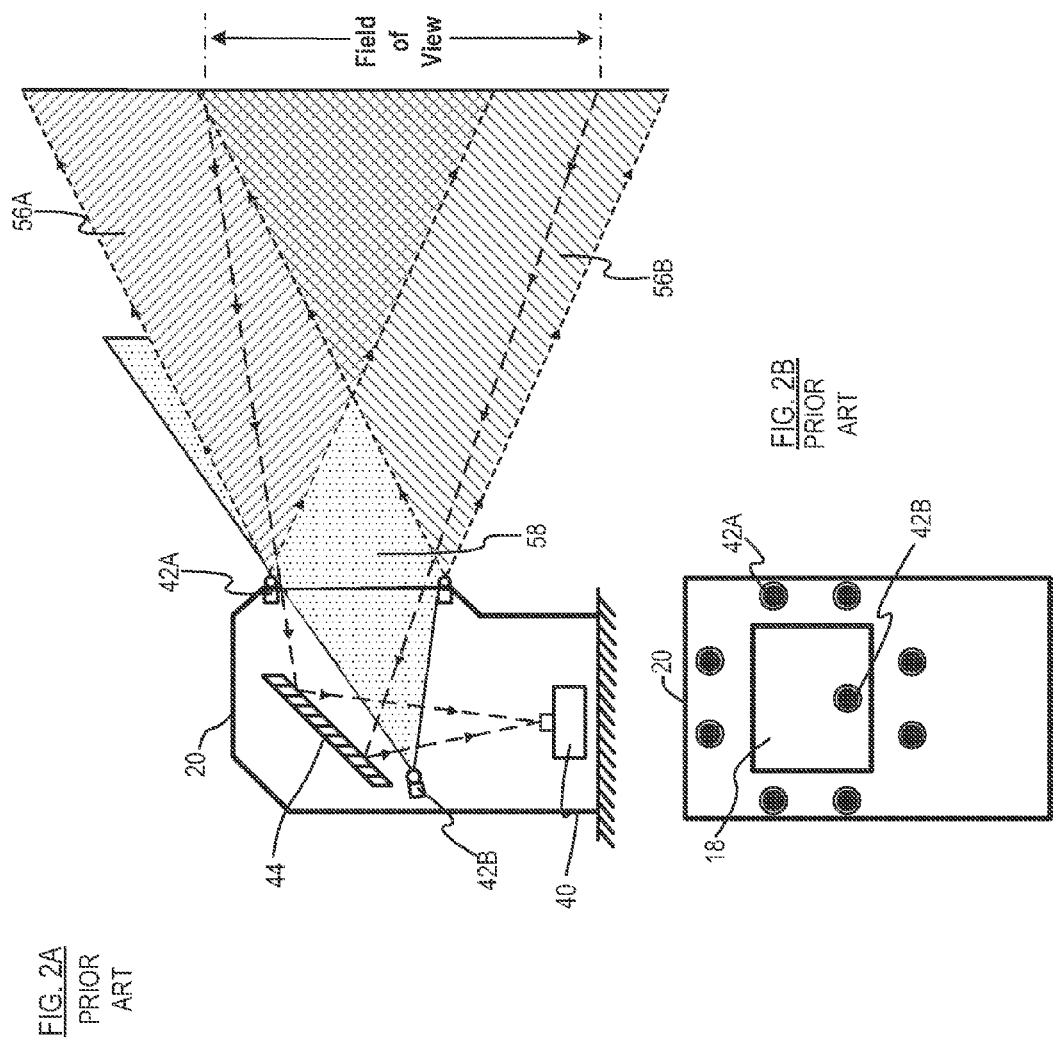
FIGS. 2A and 2B show one exemplary prior art arrangement for attempting to uniformly illuminate objects at a close field of view.
Figure 3:
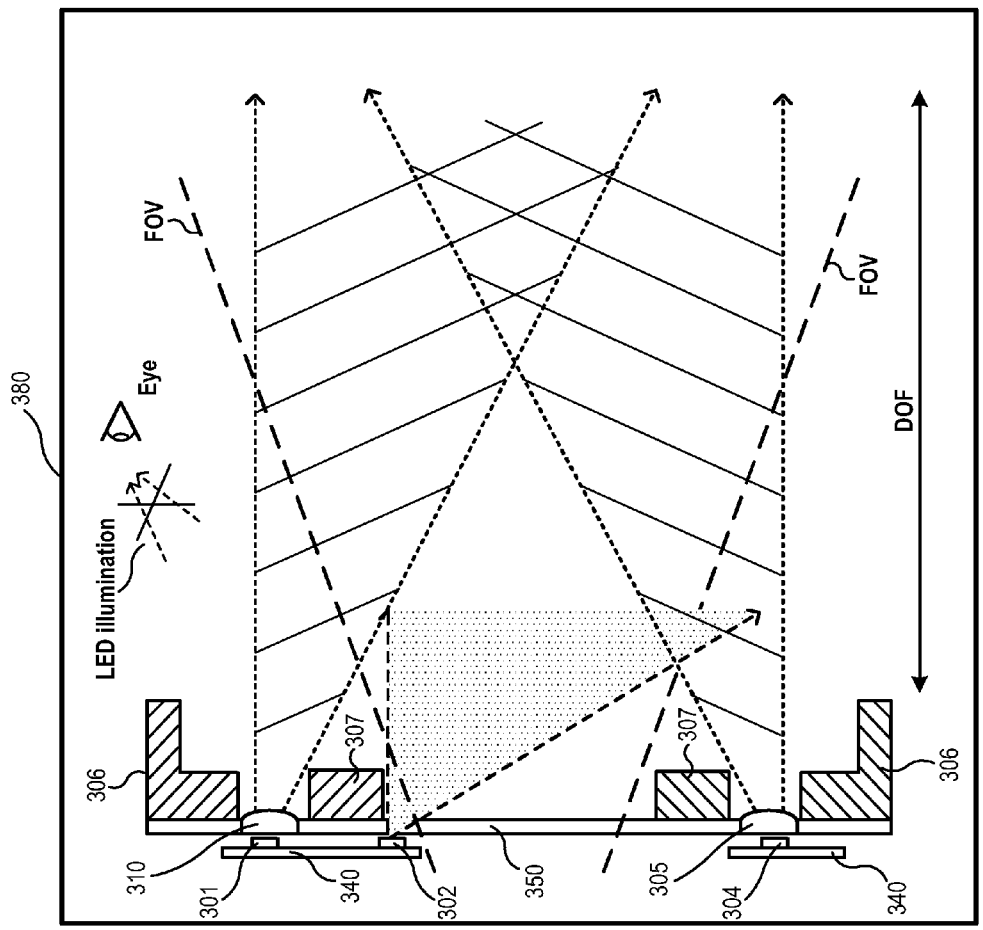
FIG. 3 shows a side view from an exemplary embodiment of the present invention.

FIG. 3 depicts a conceptual side view of an imaging device utilizing the illumination technique of the present invention. The arrangement includes a masking device 306 which partially shields the illumination means 301 and 304 as shown, thereby avoiding the illumination being projected into a user's eyes. An inner portion of the mask is designated 307. The mask is preferably continuous, as shown in FIG. 4A, and includes an opening surrounding the LED to provide an output path for the light.

As shown best in FIG. 3, an illumination means 304 is placed behind a lens 305 in an offset manner so that the lens 305 acts to direct the illumination to a far field of view. A similar arrangement is employed and depicted as illumination means 301 with lens 310. The illumination means 301 and 304 act in concert to provide illumination for the far field of view, also as depicted in FIG. 3. Further, the illumination means 302 acts to provide illumination for the near field of view.

Although the arrangement provides for a substantially uniform illumination from a near field of view to a far field of view, it is nonetheless still contemplated that a user can select between the near and far field of view, and activate the appropriate illumination means (e.g., LEDs). Or, both can simply be activated when the device is activated for capturing an image.

Figure 4A:
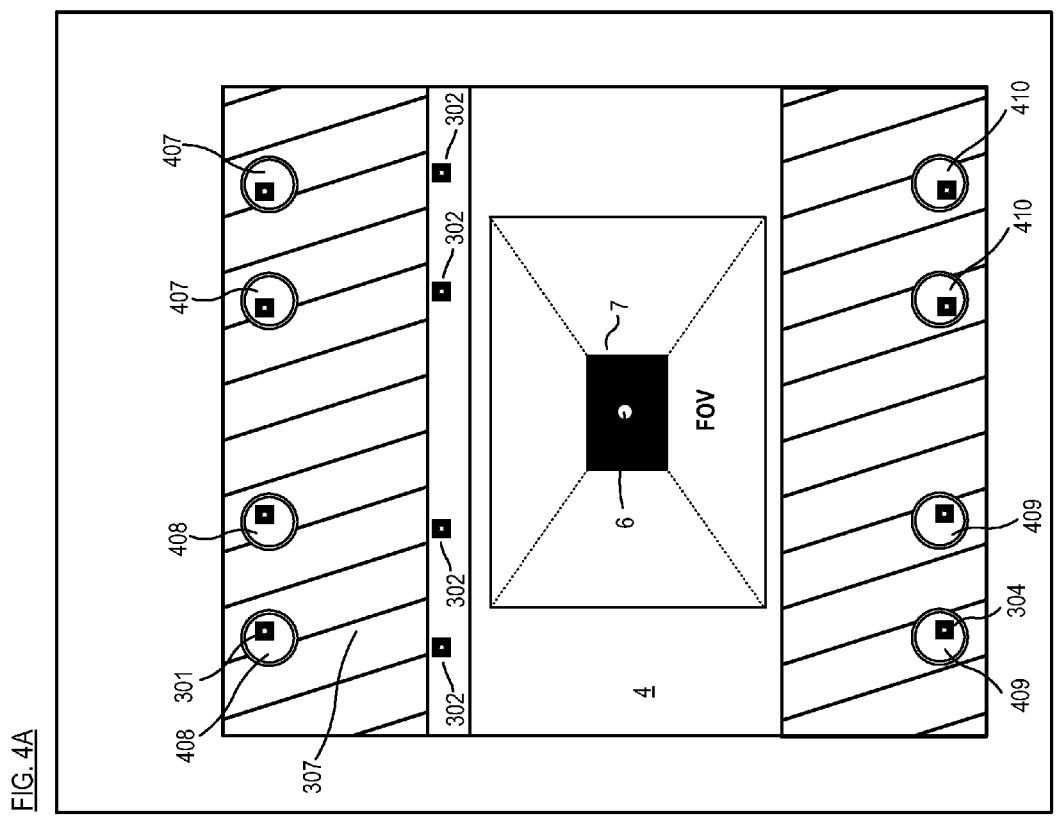
FIG. 4A is a front view of an exemplary embodiment of the present invention and FIG. 4B depicts the manner in which the location of an LED is referenced with respect to the mask opening.

For example, and with reference to FIG. 4A, a user may select, via a user selectable switch for example, LEDs 301 and 304 to be illuminated, which would illuminate a far field of view, or a user may select LEDs 302 to illuminate when an object is within the near field of view. It is also possible that such selection can occur automatically, and to illuminate the appropriate LEDs, such as by a laser based distance measuring apparatus known in the art.

The LEDs 301 and 304 may be mounted on a circuit board 340, and other electronics may be on circuit board 350 as well.

Note exemplary LED 304 is aligned with a side of a lens 305 that itself is aligned with an outer mask portion 306. By placing the LED 304 near to the outer side mask, the beam is directed correctly as shown, and the outer side mask shields the user from having to view the light being emitted by the illumination means 301 and 304.

Figure 4B:
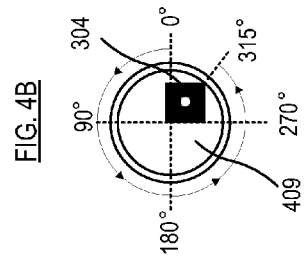

FIG. 4A depicts a front view of the imaging device, showing the mask, having inner portion 307 and outer portion 306 (see FIG. 3) as well as camera lens 6 and CCD or CMOS sensor 7 and indicating the field-of-view (FOV) of the imaging device. Within the mask are openings 407 through 410 that enable light from the upper LEDs 301 and lower LEDs 304 to properly illuminate the target. Note that each opening 407-410 is actually plural openings; that is, in the illustrative embodiment, there are paired openings 407 (i.e., the two upper-right openings in FIG. 4A), paired openings 408 (i.e., the two upper-left openings), etc. The LED within each opening is closest to a different portion thereof for each of the four sets 407, 408, 409, and 410 of two openings. Specifically, the LED within each opening 409 is closest to a part of the opening that would form an angle of 315 degrees with respect to the horizontal, if the opening represented a Cartesian plane. This measurement scheme is illustrated in FIG. 4B. Within opening 410, that angle would be 215 degrees. Within opening 407, that angle would be 135 degrees. And within opening 408, that angle would be 45 degrees.

The foregoing positioning of the LEDs within the openings results in the illumination of the proper field of view for objects located relatively far from the device. For near field objects, the illuminations means 302 is used, as shown in FIGS. 3 and 4A. These LEDs 302 are optionally not surrounded by mask portions 306 and 307, but their light is nonetheless advantageously blocked from the user's view by mask portions 306 and 307. Of course, the entire device may be disposed within a suitable housing, shown only conceptually as 380 for purposes of explanation.

While the foregoing describes the preferred embodiments of the present invention, other variations are possible as well. The imaging array may be comprised of any suitable technology other than CMOS or CCD. The lenses shown may be LED mask lenses, or other types of lenses, and the illumination may be derived from sources other than LEDs. These and other embodiments are intended to be within the scope of the appended claims.

The invention claimed is:

1. An imaging device comprising:
   a first illumination means having a first light source, wherein the first light source is arranged to illuminate a field of view at a first depth-of-field from the device;
   a second illumination means having a second light source and a third light source, wherein the second and third light sources are arranged to illuminate a field of view at a second and further depth-of-field from said device;
   a masking portion having a first opening and a second opening that respectively surrounds the second and third light sources:
   (i) wherein the second light source is offset within the first opening relative to a center of a first lens arranged in front of the first opening,
   (ii) wherein the third light source is offset within the second opening relative to a center of a second lens arranged in front of the second opening,
   (iii) wherein the center of the first lens is independent of the center of the second lens,
   (iv) wherein the second light source, as a result of its offset, is positioned differently within the first opening when compared to the position of the third light source within the second opening,
   (v) wherein the second light source is a Light Emitting Diode (LED) that is aligned with one side of the first lens arranged in front of the first opening, and
   (vi) wherein the first lens is aligned with an outer side of the masking portion, the outer side of the masking portion being dimensioned and arranged to partially shield illumination that is emitted by the second light source; and
   an imaging array to capture light reflected from a target object.

2. The imaging device of claim 1 wherein the first light source is an LED with the mask portion on one side thereof.

3. The imaging device of claim 2 wherein the second and third light sources are LEDs with the mask portion on both sides thereof.

4. The imaging device of claim 2 wherein illumination via the first illumination means or the second illumination means is user selectable.

5. An imaging device comprising an imaging array disposed within a housing, a plurality of first illumination sources for illuminating a target to be imaged, the plurality of first illumination sources being surrounded by a masking portion, the masking portion comprising a plurality of openings, a respective opening thereof corresponding to a respective one of the first illumination sources thereby enabling light to be emitted:
   (i) wherein one of the first illumination sources within at least a first one of the openings is positioned differently with respect to said first opening as compared to the position occupied by another of the first illumination sources in at least a second one of the openings of the mask,
   (ii) wherein the relative positioning of the first illumination sources with respect to the corresponding openings affects the area illuminated by the first illumination sources,
   (iii) wherein the one of the first illumination sources is a Light Emitting Diode (LED) that is aligned with one side of a first lens arranged in front of the first opening, and
   (iv) wherein the first lens is aligned within an outer side of the masking portion, the outer side of the masking portion being dimensioned and arranged to partially shield illumination that is emitted by the one of the first illumination sources; and
   a plurality of second illumination sources which are not surrounded by said masking portion, the plurality of first and second illumination sources being arranged to illuminate an object at different depths-of-field from said imaging device.

6. The imaging device of claim 5 wherein the plurality of first illumination sources include LEDs.

7. The imaging device of claim 5 wherein there are plural pairs of illumination sources, and wherein within each pair thereof the illumination sources are positioned similarly with respect to the corresponding openings in the mask, but that positioning is different among the different pairs of illumination sources.

8. The imaging device of claim 5 wherein the imaging device automatically illuminates either the plurality of first or second illumination sources, depending upon a distance between the device and a target to be imaged.

9. The imaging device of claim 5 wherein all of said pluralities of illumination sources are installed in a common plane.

10. The imaging device of claim 5 wherein the plurality of illumination sources are installed on plural circuit boards.

* * * * *